United States Patent Office 3,639,297
Patented Feb. 1, 1972

3,639,297
FOAMED PLASTICS FROM VINYL POLYMER DISPERSIONS AND PROCESS FOR THEIR MANUFACTURE
Robert Steffen, Arno Crombach, and Hermann Lossen, Burgkirchen (Alz), and Johann Bieringer, Bruck (Alz), Germany, assignors to Farbwerke Hoechst Aktiengesellschaft vormals Meister Lucius & Bruning, Frankfurt am Main, Germany
No Drawing. Filed Feb. 1, 1968, Ser. No. 702,177
Claims priority, application Germany, Feb. 10, 1967, F 51,482
Int. Cl. C08f 29/18, 47/08
U.S. Cl. 260—2.5 L                    17 Claims

ABSTRACT OF THE DISCLOSURE

The present invention provides a process for the manufacture of foamed plastics from vinyl polymer dispersions, particularly vinyl chloride homo- or copolymer dispersions. According to the invention it is essential to add to the polymer dispersions a substance containing a plurality of hydroxyl groups such as glycerol, a substance to produce a stable foam and a heat stabilizer common for vinyl polymers. The foamed polymer may be covered with sheets or films of polyvinyl chloride or other material.

---

The present invention relates to a process for the manufacture of foamed plastics from vinyl polymer dispersions.

Numerous processes have been proposed and are being used in industry for the manufacture of foamed materials from thermoplastics, above all polyvinyl chloride and copolymers containing vinyl chloride. It has been proposed, for example, to heat thermoplasts together with expanding agents in closed vessels at a temperature of which the expanding agent decomposes. According to a known process polyvinyl chloride is heated in a high pressure mould until it forms a gell, while a gas is introduced from the outside under a pressure of up to 400 kilograms/cm.$^2$ or the gas required for expansion is generated in situ by decomposition of a nitrogen-separating expanding agent. After cooling, the material is taken out of the mould and transformed into a foam by a free post expansion at elevated temperature. The cells formed in this process are very non-uniform and, therefore, the manufacture of uniformly foamed materials cannot be ensured.

In another known process an organic polyisocyanate is added to the mixture which, in a further step of the aforesaid process reacts with water in the heat whereby cross-linking of the rigid polyvinyl chloride foam is brought about with separation of $CO_2$ and formation of urea bridges. The processes referred to above have the disadvantage that they necessitate expensive, gas-tight high pressure moulds and that they can only be carried out discontinuously. Although attempts have been made to find a continuous process, no satisfactory mode of operation has hitherto been found for the manufacture of foamed materials from thermoplasts, mainly because two steps are required, namely first the extrusion of the polyvinyl chloride and then a treatment with water or steam.

A considerable progress has been achieved by using a polyvinyl chloride dispersion. In this process it is not necessary to produce dry polyvinyl chloride. The evaporation of the water and gelling of the polyvinyl chloride can be performed in one step. When a rigid polyvinyl chloride foam is to be produced by this method, it is necessary, however, to add skeleton substances, for example sols of proteins, alginates, alkali metal silicates or urea/formaldehyde solutions. When such substances are not added gelling is not satisfactory and the foam collapses.

The present invention provides a process for the manufacture of foamed masses from vinyl polymer dispersions, preferably vinyl chloride dispersions which do not have the aforesaid disadvantages by simple mechanical agitation to introduce a gas, drying and subsequent gelling of the froth, which comprises adding to the vinyl polymer dispersion a substance containing a plurality of hydroxyl groups, a substance forming with water in the heat a stable foam, which substance does not harden, a known heat stabilizing agent for vinyl polymers, possibly a plasticizer and an agent to produce a microporous form, producing a foam from the mixture in the cold by mechanical agitation advantageously in the presence of air and at atmospheric pressure, subjecting the foam having a creamy stiff consistency to a heat treatment at a temperature of up to 180° C. and if a higher density is desired subjecting the foam to a pressure treatment after the evaporation of water.

Suitable vinyl polymers for the manufacture of the foam are especially homo- and copolymers of vinyl chloride and copolymers of vinyl chloride and vinyl acetate, vinyl isobutyrate and/or octylacrylate, advantageously in the form of dispersions having a solids content of more than 50%, and also mixtures thereof with known polymers, for example an elastifying butadiene/acrylonitrile dispersion.

As substances containing a plurality of hydroxyl groups which allow of a uniform removal of water without formation of cracks in the heat treatment there may be used glycerol, mannitol, soritol and/or glucose.

It has furthermore been found that oxethylated sulfurized aliphatic or aromatic hydroxyl compounds, fatty alcohol sulfonates, alkyl-arylsulfonic acids, sulfosuccinic acid semiesters of fatty acid ethanolamides, alkylpolyglycol ethers, alkylamide polyglycol ethers in the form of their alkali metal, alkaline earth metal, ammonium or hydroxy-alkyl-ammonium salts which neither react with themselves nor with the vinyl polymer must be added to the mixture to obtain a thermostable foam. When fatty acid alkylol amides are added to the mixture a foam is produced having very fine pores. When a soft elastic foam is to be produced plasticizers known for the polymers are added. Furthermore, for the production of an elastic foam the addition of an elastifying latex, for example a butadiene/acrylonitrile latex has proved to be particularly advantageous. In all cases a known stabilizer for vinyl polymers is added to the mixture.

When mixtures containing the specified components are used, the production of a foam is very easy. The components are intimately mixed and the mixture is frothed in a simple device by mechanical agitation in the presence of air. As soon as the froth has taken a creamy stiff consistency it is subjected to a heat treatment in a layer 1 to 30 mm. thick. The temperature required to consolidate the foam depends on the type of polymer used, it is in the range of from 150 to 180° C. When pressure is applied to the surfaces of the foam after the evaporation of water and while the foam is still warm the unit weight can be increased.

By the process according to the invention plates of foamed plastics of any shape or prismatic objects can be produced which are suitable for many applications, for example as insulating material against heat, cold and/or sound and/or as elastic packaging and embedding materials.

The foams produced by the process of the invention have a mossy structure and a density in the range of from 0.045 to 0.30. They are free from skeleton substances and inorganic constituents.

According to a special variant of the process of the invention the uncured, water-containing foam is applied in a layer of 5 to 30 millimeters to a support, for example rigid polyvinyl chloride, a phenoplast, molded fiber board, roofing paste board, corrugated board, melamine resin and the like. After curing the foam is firmly bonded to the support and can be used in this form. Products of this kind also find many applications. They are distinguished by a solid bond between foam and support. Efforts to remove the foam from the support result in a partial or total destruction of the system.

According to a further variant of the process of the invention the vinyl polymer foam which is still hot from the evaporation of water is spread on a support as defined above and covered with a layer of a substance capable of being heat-sealed with polyvinyl chloride. In this manner a board of vinyl polymer foam bilaterally covered with a surface protecting layer is obtained which can also be used for many applications.

The following examples serve to illustrate the invention but they are not intended to limit it thereto, the parts being by weight unless otherwise stated.

EXAMPLE 1

2 parts of di-tert.-butyl-p-cresol and 1 part of butyl-thiostannic acid, 20 parts of a 28% solution of sulfurized lauryl alcohol oxethylate and 5 parts of glycerol were added to 100 parts of a polyvinyl chloride dispersion having a solids content of about 60% and containing as emulsifier the sodium salt of a paraffin-sulfonic acid. A foam was produced from the mixture by mechanical churning. When a creamy stiff foam was obtained it was spread in a layer of 1 to 30 millimeters. To evaporate the water and consolidate the foam it was subjected to a heat treatment. The starting temperature was 80° C. which was raised to 170° C. in the course of about 30 minutes and maintained at 170° C. for a further 15 minutes. After cooling and taking from the mold a rigid PVC foam was obtained having a unit weight of 100 kilograms per cubic meter.

When the foam was compressed after evaporation of the water and while it was still hot a two to three times higher unit weight could be obtained.

EXAMPLE 2

A foam was produced as described in Example 1 with the exception that instead of the sodium salt of paraffin-sulfonic acid the sodium salt of a dialkylsuccinic acid was used as emulsifier. The foam obtained had a unit weight of 45 kilograms per cubic meter.

EXAMPLE 3

A foam was produced as described in Example 2 with the exception that 2.5 parts of d-sorbitol were used instead of 5 parts of glycerol. The foam obtained had a unit weight of 60 kilograms per cubic meter.

EXAMPLE 4

A foam was produced as described in Example 2 with the exception that 3 parts of d-mannitol were used instead of 5 parts of glycerol. The foam obtained had a unit weight of 55 kilograms per cubic meter.

EXAMPLE 5

100 parts of a 60% latex from 95% of vinyl chloride and 5% of vinyl acetate, prepared with the use of the sodium salt of dialkylsulfosuccinic acid as emulsifier, were used. 4 Parts of glycerol and 15 parts of a 28% aqueous solution of the sodium salt of sulfurized oxethylated lauryl alcohol were added. The foam was produced as described in Example 1. The final heating temperature amounted to 150° C. The foam obtained had a unit weight of 60 kilograms per cubic meter.

EXAMPLE 6

The latex used in Example 5 was admixed with 3 parts of d-glucose and 20 parts of a 28% aqueous solution of the sodium salt of sulfurized oxethylated lauryl alcohol and a foam was produced as described in Example 1. The foam obtained had a unit weight of 65 kilograms per cubic meter.

EXAMPLE 7

6 Parts of glycerol and 25 parts of a 28% aqueous solution of the sodium salt of sulfurized oxethylated lauryl alcohol were added to 100 parts of a 60% latex from 95% of vinyl chloride and 5% of vinyl isbutyrate prepared with sodium dialkylsulfosuccinate as emulsifier and the mixture was foamed at a final temperature in the heating step of 160° C. A foam was obtained having a unit weight of 60 kilograms per cubic meter.

EXAMPLE 8

30 parts of a gelled finely granulated foam obtained by the process of the invention were added to the mixture used in Example 2. The foam obtained had a unit weight of 75 kilograms per cubic meter.

EXAMPLE 9

120 parts of a 50% latex obtained by the process specified in Example 2 were foamed as described in Example 2. As stabilizer 2 parts of a commercial amino-isocrotonic acid ester were used. The foam obtained had a unit weight of 60 kilograms per cubic meter.

EXAMPLE 10

A mixture was prepared as described in Example 2. 3 parts of a 37% dispersion of a butadiene/acrylonitrile copolymer were added. A slightly elastified foam was obtained having a unit weight of 100 kilograms per cubic meter.

EXAMPLE 11

The prescription of Example 1 was modified in that the sodium salt of an alkylarylsulfonic acid was used as emulsifier. The foam obtained had a unit weight of 80 kilograms per cubic meter.

EXAMPLE 12

40 parts of a 50% dispersion of a copolymer of vinyl chloride, vinyl isobutyrate and octylacrylate and 2 parts of an aminocrotonic acid ester instead of butyl-thiostannic acid as stabilizer were added to the mixture of Example 2. The final temperature of the heating step amounted to 165° C. The foam obtained had a unit weight of 46 kilograms per cubic meter.

EXAMPLE 13

Instead of the combination of butyl-thiostannic acid/di-tert.-butyl-p-cresol, 2 parts of a commercial aminocrotonic acid ester were added as stabilizer to 100 parts of a 60% PVC latex prepared with the use of the sodium salt of a dialkylsulfosuccinic acid as emulsifier. Instead of the solution of the sodium salt of an oxethylated and sulfurized cocos fat alcohol there were used 15 parts of a 22% solution of the corresponding potassium salt. The mixture contained 5% of glycerol and the maximum heating temperature amounted to 180° C. A foam was obtained having a unit weight of 50 kilograms per cubic meter.

EXAMPLE 14

A mixture was prepared as described in Example 13 with the exception that instead of the potassium salt 15 parts of a 25% solution of a corresponding magnesium salt were used. The foam obtained had a unit weight of 57 kilograms per cubic meter.

EXAMPLE 15

The prescription of Example 14 was modified as follows: instead of the solution of the magnesium salt there were used 15 parts of a 25% solution of the corresponding ammonium salt. The foam obtained had a unit weight of 61 kilograms pre cubic meter.

EXAMPLE 16

The prescription of Example 15 was modified as follows: instead of the defined ammonium salt there were added 10 parts of a 25% solution of the corresponding monoethanol-ammonium salt. The foam had a unit weight of 56 kilograms per cubic meter.

EXAMPLE 17

The prescription of Example 16 was modified as follows: instead of the monoethanol-ammonium salt there were used 10 parts of a 25% solution of the corresponding diethanol-ammonium salt. The foam obtained had a unit weight of 60 kilograms per cubic meter.

EXAMPLE 18

The prescription of Example 17 was modified as follows: instead of the diethanol-ammonium salt there were used 12 parts of a 25% solution of the corresponding triethanol-ammonium salt. The foam obtained had a unit weight of 63 kilograms per cubic meter.

EXAMPLE 19

2 parts of a commercial amino-crotonic acid ester as stabilizer, 6 parts of sodium laurylsulfate and 5 parts of glycerol were added to 100 parts of a 60% PVC latex prepared with the use of the sodium salt of a dialkylsulfosuccinic acid as emulsifier and the mixture was foamed as described in Example 1. The foam obtained had a unit weight of 52 kilograms per cubic meter.

EXAMPLE 20

A mixture was prepared as described in Example 19 with the exception that instead of sodium laurylsulfate 17 parts of a 30% solution of ammonium laurylsulfate were used. The foam obtained had a unit weight of 55 kilograms per cubic meter.

EXAMPLE 21

The prescription of Example 19 was modified as follows: instead of sodium laurylsulfate there were used 10 parts of a 50% solution of triethanol-ammonium lauryl sulfate. The foam obtained had a unit weight of 55 kilograms per cubic meter.

EXAMPLE 22

A mixture was prepared as described in Example 1 with the exception that instead of the sodium salt of sulfurized oxethylated lauryl alcohol 13 parts of a 50% solution of the sodium salt of a sulfurized oxethylated tributylphenol and as emulsifier the sodium salt of a dialkylsulfosuccinic acid were used. The foam obtained had a unit weight of 60 kilograms per cubic meter.

EXAMPLE 23

Instead of the sodium lauryl sulfate used in Example 19, 3.5 parts of sodium dodecyl-benzene sulfonate were used. The foam obtained had a unit weight of 55 kilograms per cubic meter.

EXAMPLE 24

Instead of sodium lauryl sulfate, 7 parts of the sodium salt of the sulfosuccinic acid semiester of lauric acid monoethanol amide were added. The foam obtained had a unit weight of 58 kilograms per cubic meter.

EXAMPLE 25

Example 19 was modified in that 8 parts of a 40% solution of the sodium salt of sulfosuccinic acid semiester of lauryl polyglycol ether were used instead of sodium lauryl sulfate. The foam obtained had a unit weight of 51 kilograms per cubic meter.

EXAMPLE 26

Example 19 was modified in that 10 parts of a 50% solution of the sodium salt of sulfosuccinic acid semiester of an alkylolamide polyglycol ether was used. The foam obtained had a unit weight of 61 kilograms per cubic meter.

EXAMPLE 27

30 parts of a 37% butadiene/acrylonitrile latex and 30 parts of dioctyl phthalate were added to the latex specified in Example 5. As stabilizer 2 parts of amino-isocrotonic acid ester were used and furthermore 18 parts of a 27% solution of the sodium salt of the sulfurization product defined in Example 5 of oxethylated lauryl alcohol and 4 parts of glycerol were added. The foam was produced as described in Example 1, the final temperature of the heat treatment amounting to 160° C. A soft elastic foam was obtained having a unit weight of 110 kilograms per cubic meter.

EXAMPLE 28

Example 27 was modified in that 20 parts of a phenol or cresol ester of a long chian paraffin-sulfonic acid were added as plasticizer. 15 parts of 37% butadiene/acrylonitrile latex were added. The foam obtained had a unit weight of 125 kilograms per cubic meter.

EXAMPLE 29

Example 28 was modified in that 30 parts of a dialkyl adipate were added as plasticizer. The addition of 37% butadiene-acrylonitrile latex amounted to 40 parts. The foam obtained had a unit weight of 120 kilograms per cubic meter.

EXAMPLE 30

Example 29 was modified in that 40 parts of diphenyloctyl phosphate were added as flame-retarding plasticizer. The addition of 37% butadiene/acrylonitrile latex amounted to 30 parts. The soft foam obtained had a unit weight of 130 kilograms per cubic meter.

EXAMPLE 31

1 part of oleic acid diethanol amide was added to any of the mixtures of Examples 1 to 30. Under otherwise identical conditions micro-porous foams were obtained having the respective unit weight.

EXAMPLE 32

2 parts of lauric acid monoethanol amide were added to any of the mixtures of Examples 1 to 30. Under otherwise identical conditions micro-porous foams were obtained having the respective unit weight.

EXAMPLE 33

A foam was produced according to any one of the methods described above on a sheet of rigid polyvinyl chloride as support. When heating was terminated, the foam was firmly connected with the sheet and could be used in this form.

EXAMPLE 34

A foam was produced as defined in Example 32 on a molded fiber board as support. After evaporation of the water from the dispersion and gelling, the foam which still had a temperature of 150 to 180° C. was covered with a second molded fiber board coated with a heat sealing layer of, for example, polyvinyl acetate. The upper layer was firmly bonded to the foam and a sandwich system with interposed foam layer was obtained.

What is claimed is:
1. The process for producing foamed materials from vinyl polymer dispersions which comprises mechanically agitating a mixture consisting essentially of
  (a) 100 parts by weight of a vinyl chloride homopolymer or copolymer dispersion,
  (b) 2 to 7 parts by weight of glycerol, mannitol, sorbitol, glucose or mixtures thereof,

(c) 5 to 40 parts by weight of an alkali metal, alkaline earth metal, ammonium or hydroxy-alkyl-ammonium salt of an oxethylated sulfurized aliphatic or aromatic hydroxy compound, a fatty alcohol sulfonate, an alkyl-arylsulfonic acid, a sulfosuccinic acid semiester of a fatty acid ethanolamide, an alkylamide polyglycol ether, or an alkyl polyglycol ether and (d) 0.5 to 3 parts by weight of a heat stabilizer for vinyl polymers, said agitation being in air and in the cold to produce a foam having a creamy stiff consistency and heating the foam at a temperature of up to 180° C.

2. The process of claim 1 wherein a plasticizer is included in said mixture.

3. The process of claim 1 wherein an agent producing a microporous foam is included in said mixture.

4. The process of claim 1 wherein said foam, after heating, is subjected to pressure to obtain a higher unit weight.

5. The process of claim 1 wherein (a) is a vinyl chloride copolymer dispersion wherein the comonomer is vinyl isobutyrate, octyl acrylate or a mixture thereof.

6. The process of claim 1 wherein said dispersion has a solids content of over 50 weight percent.

7. The process of claim 1 wherein said mixture includes an elastifying butadiene/acrylonitrile dispersion.

8. The process of claim 3 wherein said agent is a fatty acid alkanolamide.

9. The process of claim 1 wherein said foam is dried and gelled on a support which is bonded to the foam.

10. The process of claim 1 wherein the cured but still warm foam is covered with a layer capable of being heat-sealed.

11. The process according to claim 1 wherein (a) is a dispersion having a solids content of above 50% by weight of a vinyl chloride homopolymer, a copolymer of vinyl chloride with vinyl acetate, vinyl isobutyrate, vinyl octylacrylate or mixtures thereof, or a mixture thereof with an elastifying butadiene/acrylonitrile dispersion, the mixture additionally contains a plasticizer, a fatty acid alkanolamide or mixtures thereof and the foam is heated at temperature of 150 to 180° C.

12. A foamed material having a unit weight in the range of from 40 to 300 kilograms per cubic meter, said foamed material being produced from 100 parts by weight of vinyl chloride homopolymer or copolymer dispersion by foaming with a foaming agent consisting essentially of 1 to 3 parts by weight of di-tert. butyl-p-cresol, 0.5 to 3 parts by weight of a polyvinyl chloride stabilizer, 2 to 7 parts by weight of glycerol, sorbitol, mannitol or glucose, 5 to 40 parts by weight of a 10 to 50% solution of an alkali metal, alkaline earth metal, ammonium or hydroxy-alkyl-ammonium salt of an oxethylated sulfurized aliphatic or aromatic hydroxyl compound, an alkyl-arylsulfonic acid, a fatty alcohol sulfonate, a sulfosuccinic acid semiester of a fatty acid ethanolamide, an alkyl polyglycol ether or an alkylamide polyglycol ether.

13. The foamed material of claim 12 wherein said dispersion additionally contains 1 to 3 parts by weight of a fatty acid alkanolamide.

14. The foamed material of claim 12 wherein said dispersion additionally contains a plasticizer for said vinyl chloride homopolymer or copolymer.

15. The foamed material of claim 12 wherein said dispersion is a vinyl chloride copolymer dispersion wherein the comonomer is vinyl butyrate, octyl acrylate or a mixture thereof.

16. The foamed material of claim 12 wherein said dispersion includes an elastifying butadiene/acrylonitrile copolymer.

17. The foamed material of claim 12 covered on one or both sides with sheets or films of rigid or soft polyvinyl chloride, phenoplast, molded fiber board, roofing paste board, corrugated board or melamine resin.

References Cited

UNITED STATES PATENTS

| | | | |
|---|---|---|---|
| 2,966,470 | 12/1960 | Maltenfort | 260—2.5 F |
| 3,338,845 | 8/1967 | Alzner et al. | 260—2.5 F |
| 2,444,546 | 7/1948 | Walsh | 260—2.5 L |
| 2,796,449 | 6/1957 | Neale et al. | 260—2.5 L |
| 2,822,338 | 2/1958 | Hay | 260—2.5 L |
| 3,405,078 | 10/1968 | Geer | 260—2.5 L |

OTHER REFERENCES

Penn, W. S., Polyvinyl Chloride Technology; Maclaren and Sons, Ltd. London (1962). P 986.V48 P4 pp. 382 and 388.

MURRAY TILLMAN, Primary Examiner

W. J. BRIGGS, SR., Assistant Examiner

U.S. Cl. X.R.

161—247, 248, 249, 252, 254; 260—2.5 P, 23 XA, 29.6 E, 29.6 MN, 29.6 MQ, 29.7 UA